US008862703B2

(12) United States Patent
Quintard

(10) Patent No.: US 8,862,703 B2
(45) Date of Patent: *Oct. 14, 2014

(54) ADDRESS SERVER

(75) Inventor: Christophe Quintard, Toulouse (FR)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/613,883

(22) Filed: Sep. 13, 2012

(65) Prior Publication Data

US 2014/0068223 A1 Mar. 6, 2014

Related U.S. Application Data

(63) Continuation of application No. 13/389,554, filed as application No. PCT/EP2010/060320 on Jul. 16, 2010.

(30) Foreign Application Priority Data

Sep. 17, 2009 (EP) .................................. 0930586108

(51) Int. Cl.
  *G06F 15/177* (2006.01)
  *H04L 29/12* (2006.01)
  *G06F 12/06* (2006.01)
  *G06F 9/445* (2006.01)
  *G06F 9/455* (2006.01)

(52) U.S. Cl.
  CPC ...... *G06F 12/0653* (2013.01); *H04L 29/12216* (2013.01); *H04L 61/2007* (2013.01); *G06F 2009/45595* (2013.01); *G06F 8/61* (2013.01)
  USPC .......................................... 709/220; 709/245

(58) Field of Classification Search
  CPC ...................... H04L 61/2061; H04L 29/12283; H04L 61/6068; H04L 61/2015; H04L 61/2007

USPC .................. 709/226, 220, 227, 245; 370/338; 345/543

See application file for complete search history.

(56) References Cited

U.S. PATENT DOCUMENTS 6,208,656 B1   3/2001   Hrastar et al.
7,302,484 B1 * 11/2007  Stapp et al. .................... 709/226

(Continued)

FOREIGN PATENT DOCUMENTS

| CN | 101517544 A | 8/2009 |
|----|-------------|--------|
| JP | 2005210554 A | 8/2005 |

OTHER PUBLICATIONS

International Search Report and Written Opinion, International Application No. PCT/EP2010/060320 dated Feb. 2, 2011, 11 pages.

(Continued)

*Primary Examiner* — Vivek Srivastava
*Assistant Examiner* — Muhammad A Raza
(74) *Attorney, Agent, or Firm* — Francis Lammes; Stephen J. Walder, Jr.; Parashos T. Kalaitzis

(57) ABSTRACT

A mechanism is provided for attributing network addresses to virtual machines. A request for a number of addresses is received from a requesting entity, thereby forming a requested number of addresses. A length of continuous ranges of available addresses is compared to the requested number of addresses. A range of available addresses comprising a number of addresses greater than the requested number of addresses is selected from a memory, thereby forming a selected range of available addresses. A first new range comprising the requested number of addresses excised from the selected range of available addresses is defined and one or more further new ranges are defined comprising the remainder of the selected range of available addresses not belonging to the first new range. The first new range is attributed for the use of the requesting entity.

3 Claims, 6 Drawing Sheets

(56) References Cited

U.S. PATENT DOCUMENTS

| | | | |
|---|---|---|---|
| 7,349,392 B2 * | 3/2008 | Banerjee | 370/392 |
| 7,788,345 B1 * | 8/2010 | Sukiman et al. | 709/220 |
| 2004/0162914 A1 | 8/2004 | St. Pierre et al. | |
| 2006/0075123 A1 | 4/2006 | Burr et al. | |
| 2008/0159289 A1 | 7/2008 | Narayanan et al. | |
| 2012/0144005 A1 | 6/2012 | Quintard | |

OTHER PUBLICATIONS

U.S. Appl. No. 13/389,554.

* cited by examiner

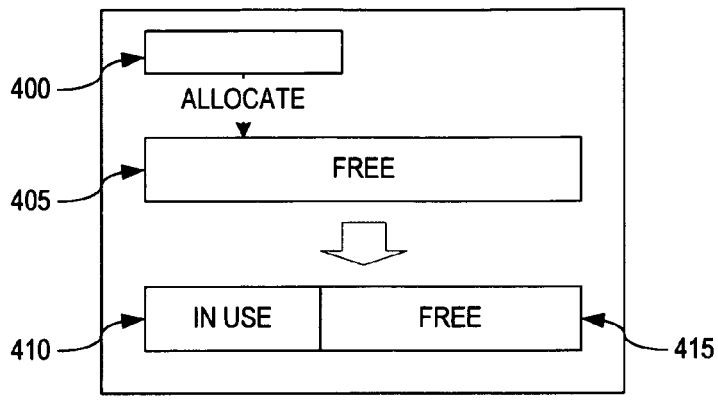
*Figure 4a* – SPLIT A RANGE INTO TWO RANGES
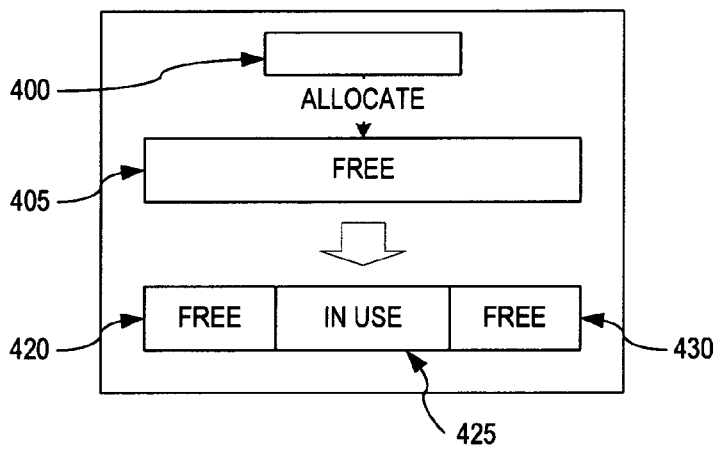
*Figure 4B* – SPLIT A RANGE INTO THREE RANGES
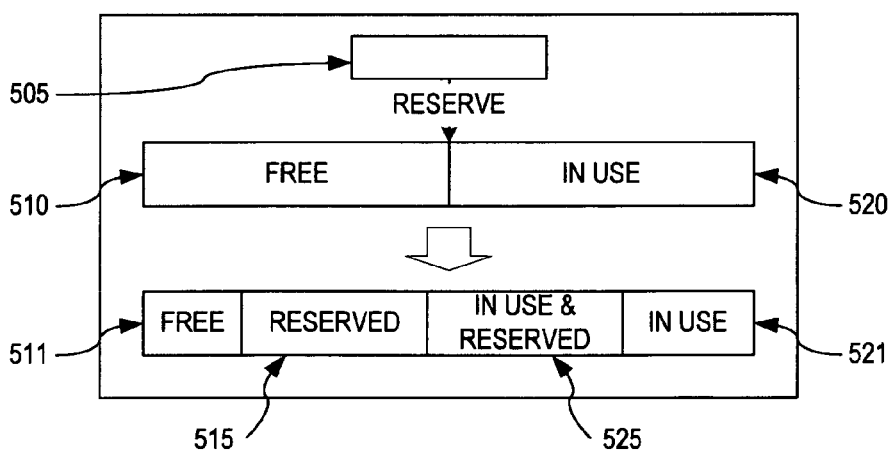
*Figure 5*

ADDRESS SERVER

GOVERNMENT RIGHTS

This invention was made with Government support under DARPA, HR0011-07-9-0002. THE GOVERNMENT HAS CERTAIN RIGHTS IN THIS INVENTION.

BACKGROUND

The present invention relates to an address server for managing network addresses and a method of attributing network addresses in a parallel computing environment.

In a parallel computing environment, such as a High Performance Computing environment, there are large parallel applications running on thousands of nodes. It is necessary to run those applications into containers in order to be able to checkpoint and restart the applications. The technique known as Checkpointing involves saving the state of a running application into a file such that the complete state may be restored and the application continued at a future time. The technique known as Restarting involves restoring the state from a checkpoint file and resuming execution in such a way that the application continues to run as if the application had not been interrupted (but possibly on a different set of compute nodes).

It is possible during the checkpoint and restart operations to save and restore the state of the TCP/IP connections, but this requires the virtualization of the network. To do so, at least one virtual IP address is associated to each container. The TCP/IP connections go through the virtual address, so the TCP/IP connections may be moved from a node to another. For a given application, all the virtual IP addresses must be belong to the same sub network. A virtual IP addresses must not be used at the same time by two different applications, or this will result in a TCP/IP conflict.

SUMMARY

In one illustrative embodiment, a method, in a data processing system, is provided for attributing network addresses to virtual machines, where all available addresses are described as one or more continuous address ranges, each address range being respectively defined by a start address and an end address. The illustrative embodiment receives a request for a number of addresses from a requesting entity, thereby forming a requested number of addresses. The illustrative embodiment compares a length of continuous ranges of available addresses to the requested number of addresses. The illustrative embodiment selects a range of available addresses from a memory comprising a number of addresses greater than the requested number of addresses, thereby forming a selected range of available addresses. The illustrative embodiment defines a first new range comprising the requested number of addresses excised from the selected range of available addresses. The illustrative embodiment defines one or more further new ranges comprising the remainder of the selected range of available addresses not belonging to the first new range. The illustrative embodiment attributes the first new range for the use of the requesting entity.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

Embodiments of the present invention will now be described by way of example with reference to the accompanying drawings in which like references denote similar elements, and in which:

FIG. 4*a* shows schematically the allocation of memory in accordance with an embodiment;

FIG. 4*b* shows schematically an alternative memory allocation situation in accordance with an embodiment;

FIG. 5 shows the principle of splitting two contiguous non-homogeneous address ranges to reserve an address range spanning those two address ranges;

FIG. 7*a* shows a first stage in the beautification process;
FIG. 7*b* shows a second stage in the beautification process;
FIG. 7*c* shows a third stage in the beautification process;
FIG. 7*d* shows a fourth stage in the beautification process;
FIG. 7*e* shows a fifth stage in the beautification process.

DETAILED DESCRIPTION

One may envisage a server adapted to manage a set of virtual IP addresses that may be used to run the parallel applications. In this context, the expression may primarily indicate a software entity which may be virtualised, or otherwise abstracted from the physical means supporting its functions. This server would allow clients to allocate a given number of free virtual IP addresses and to allocate or release a given set of virtual IP addresses. A useful feature of the server would be its ability to constantly save its state into a file on the disk to be able to restart in the same state in case of failure.

As parallel applications run on thousands of nodes, the server would need to manage several thousands of virtual IP addresses.

Figure 1:
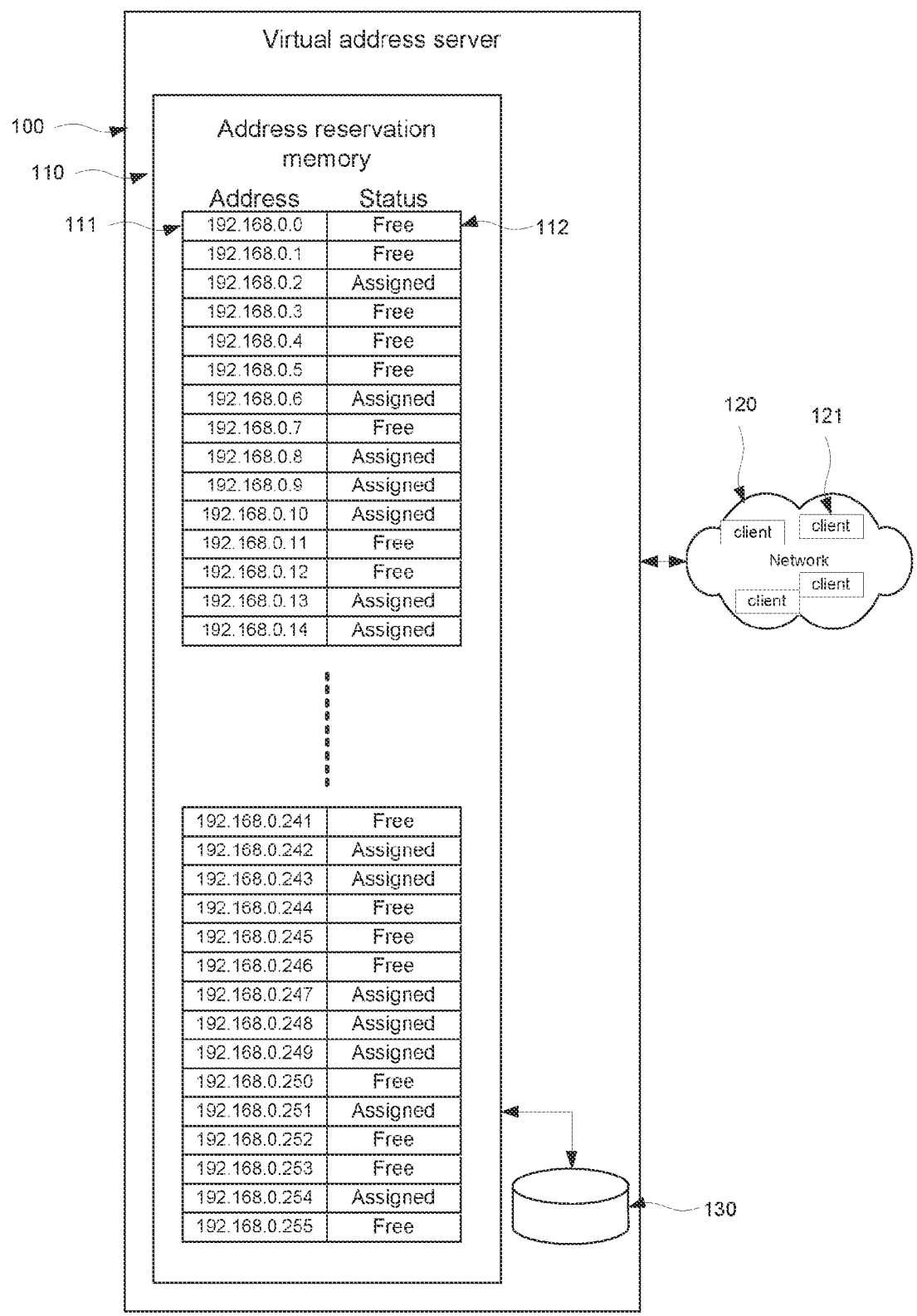
FIG. 1 is a schematic representation of a server not belonging to the present invention.

FIG. 1 is a schematic representation of such a server not belonging to the present invention. As shown, the server 100 provides for each address, a representation of its value 111 and its state 112 in memory 110. This same information could be written into the statefile 130. In the messages exchanged between the server and the clients 121, all the addresses would be written one by one, so for example when a client sends a request to allocate a given number of addresses, the message would specify all required addresses. The server would then check all the addresses one by one by locating the memory section for that address 111, and reading the value of the associated status space 112, then update the state of each required address one by one correspondingly. Each time the state of an address is updated, the server 100 will also update the statefile 130.

Although satisfactory for relatively small numbers of addresses, the inventors have determined that when the number of addresses is very large, the server would need a very large amount of memory, the statefile would be very large, the messages exchanged between the server and the clients are very large and the time required to process a request could potentially be undesirably long.

A range of addresses is described by its first and its last addresses. With only two addresses, it is possible to represent a range of hundred or thousands of addresses. This allows for saving a lot of memory. All the addresses of an address range share the same state. When the state of only some addresses of an address range have to be changed, the address range is first split into several address ranges, then the state of the different address ranges is set: a range for the addresses into the new state, and eventually address ranges before and after the new address range for the remaining addresses with the previous state. Whenever it is possible, address ranges with the same state are merged. A sequence of addresses is considered to be homogeneous if every address in that sequence has the same status, as described hereafter. An address range in accordance with the present invention is necessarily homogeneous.

Figure 2:
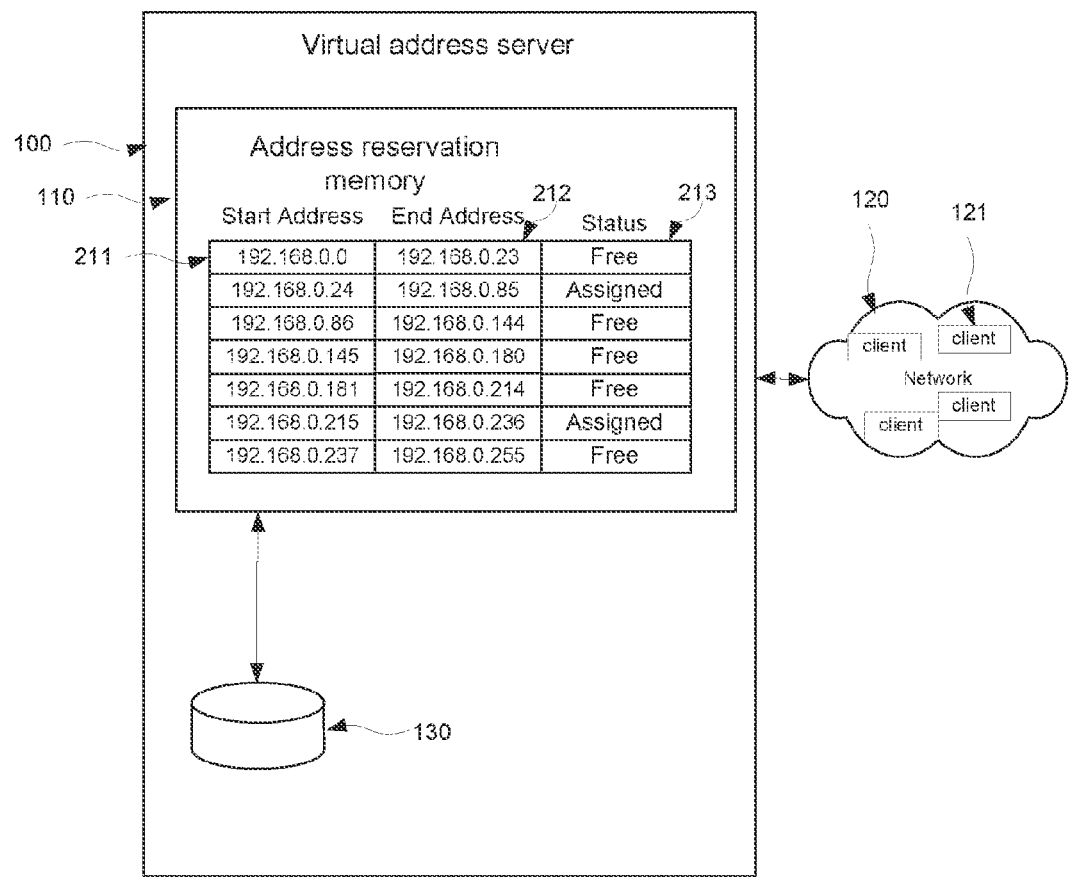
FIG. 2 shows a schematic representation corresponding to that of FIG. 1 showing an embodiment of the present invention.

FIG. 2 shows is a schematic representation corresponding to that of FIG. 1 showing an embodiment of the present invention. As shown, the server 100 describes ranges of addresses in memory 110 by means of a start address 211, an end address 212 and a status field 214. This same information could be written into the statefile 130. This representation by address range reduces drastically the memory footprint of the server, the size of the statefile, the size of the messages exchanged between the server and the clients, and the representation improves the time taken by the server to process a request.

In an example with 640K (655340) addresses, the memory used by the server described with respect to FIG. 1 might be in the order of 30 MB, whilst in accordance with the present embodiment the memory might be more in the order of 40 KB, that is a factor of 700 times fewer. Similarly the statefile used by the server described with respect to FIG. 1 might be in the order of 40 MB, whilst in accordance with the present embodiment the statefile might be more in the order of 4 KB. A message exchanged between a client and the server described with respect to FIG. 1 might be around 4 MB whilst in accordance with the present embodiment the message might be more in the order of 200 B. The time required by the previous implementation to process a request was function of the number of addresses; however, the time required to process a request is now function of the number of address ranges.

In the worst case, no two contiguous addresses have the same state, and the server needs to represent each address by an address range. This is unlikely to happen, as the server will always allocate addresses as contiguously as possible. Such a situation may happen only if the user allocates explicitly only odd addresses for example.

Preferably successive requests for the same given number of addresses are cyclically attributed different ranges of addresses, even in a case where address ranges that had previously be attributed have be released before the next request.

Accordingly, there is proposed an improved server wherein rather than representing each address in memory, ranges of addresses are used. Specifically, there is proposed a method of attributing network addresses to virtual machines wherein all available addresses are described as one or more continuous address ranges, each address range being respectively defined by a start address and an end address. The method comprises the steps of receiving a request for a given number of addresses from a requesting entity, comparing the length of continuous ranges of available addresses with the number of addresses requested, selecting a range of available addresses comprising a number of addresses greater than the requested number of addresses, defining a first new address range comprising the requested number of addresses excised from the selected address range, defining one or more further new address ranges comprising the remainder of the selected address range not belonging to the first new address range, and attributing the first new address range for the use of the requesting entity, the further new address ranges retaining their present status.

A continuous address range is an address range which includes every address which numerically or logically falls within that address range. Thus, the continuous address range having a start value of 192.168.0.1 and the end value 192.168.0.5 necessarily includes the addresses 192.168.0.2, 192.168.0.3 and 192.168.0.4. There may be certain addresses that are unavailable, for example, having been set aside for special purposes, in which case a continuous address range may be considered to be continuous although skipping such reserved addresses. Two addresses are adjacent if one is the immediate numerical successor or predecessor of the other. Thus, 192.168.0.2 and 192.168.0.3 are adjacent. Two address ranges are adjacent if the start value of one address range is adjacent the end value of the other address range. Adjacent address ranges may also be referred to as contiguous, on the basis that the adjacent address ranges together describe an unbroken sequence of addresses, and yet are defined in terms of two separate address ranges.

Figure 3:
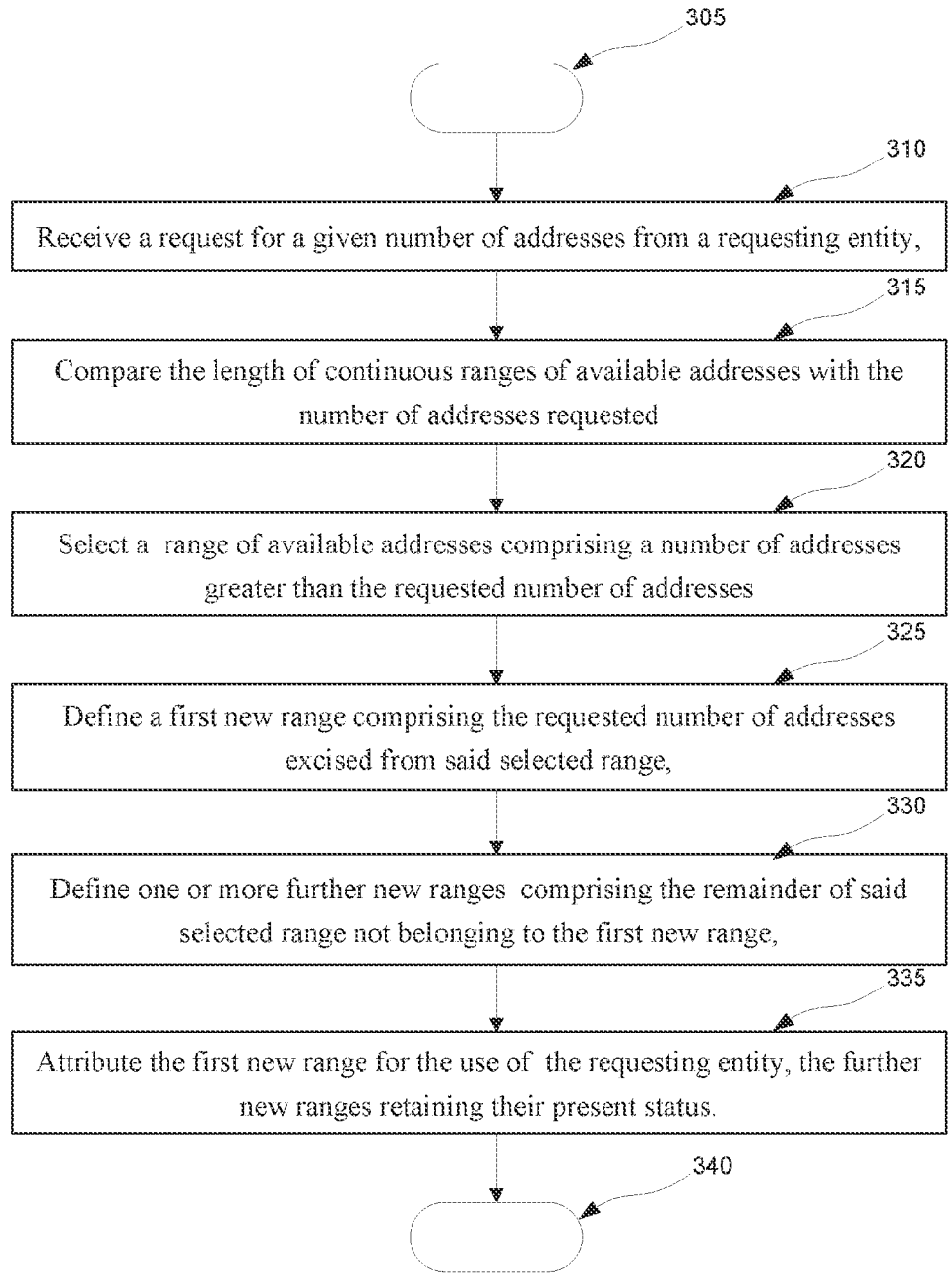
FIG. 3 is a flow chart showing the steps of an embodiment.

FIG. 3 is a flow chart showing the steps of an embodiment. As shown, the method starts as step 305, before proceeding to step 310 at which the improved server receives a request for a given number of addresses from a requesting entity. The method proceeds to step 315 at which the improved server compares the length of continuous ranges of available addresses with the number of addresses requested, e.g. as defined in the address reservation memory 110. The method then proceeds to step 320 at which the improved server selects a range of available addresses comprising a number of addresses greater than the requested number of addresses. The method then proceeds to step 325 at which the improved server excises a first new address range comprising the requested number of addresses from the selected address range is defined. Similarly at the following step 330 the improved server defines one or more further new address ranges comprising the remainder of the selected address range not belonging to the first new address range. The improved server then proceeds to attribute the first new address range for the use of the requesting entity, the further new address ranges retaining their present status, before terminating at step 335.

According to one preferred embodiment, the step 315 of comparing the length of continuous ranges of available addresses with the number of addresses requested, involves the improved server comparing the length of all continuous ranges of available addresses with the number of addresses requested, and wherein the step of selecting involves selecting the most convenient available address range of sufficient length.

According to another preferred embodiment, the step 315 of comparing the length of continuous ranges of available addresses with the number of addresses requested involves the improved server comparing the length of each continuous ranges of available addresses in turn until an available address range of sufficient length is identified, and selecting the available address range of sufficient length without comparing the length of further continuous ranges of available addresses with the number of addresses requested.

Description of the Improved Server API

According to an embodiment, the improved server recognizes the following requests:

'get'. This request gives the number of addresses to allocate, and returns the list of the ranges of the allocated addresses. According to one embodiment the improved server returns the first range of addresses the improved server finds. According to the present embodiment all the address ranges considered belong to the same sub network. Preferably, at each request, the improved server looks at a different sub network, so that the addresses so not always come from the same sub network. Preferably, the improved server cycles through the available sub networks.

'use'. This request gives the ranges of addresses to allocate, and just returns the status of the operation. The improved server checks that all the addresses are free then, if the addresses are free, allocates the addresses.

'release'. This request gives the ranges of addresses to release (unallocate), and just returns the status of the operation. The improved server releases all the addresses in use. Note that according to certain embodiments some addresses may have been reserved, so those addresses do not become free but reserved.

'make reservation'. This request gives the ranges of addresses to reserve, and returns the identifier of the reservation. The improved server creates the reservation and adds the reservation to all the addresses.

'check reservation'. This request gives the identifier of the reservation, and returns the state of the reservation (ready or not). The improved server retrieves the reservation and checks its state.

'use reservation'. This request gives the identifier of the reservation, and returns the status of the operation. The improved server checks that the reservation is ready, and if the reservation is ready, the improved server deletes the reservation and allocates all the addresses part of the reservation.

'cancel reservation'. This gives the identifier of the reservation, and returns the status of the operation. The improved server deletes the reservation and removes the reservation from all the addresses that were part of the reservation.

Description of the Internal Representation

There are several objects that are represented into the memory of the improved server: range of addresses, sub networks and reservations.

A range of addresses is an object that represents a set of continuous, sequential addresses with the same state and the same list of reservations. The properties of a range of addresses are the first address, the last address, the state of the address range ('free', 'in use' or 'reserved'), the number of addresses in the address range and the list of reservations associated to the address range. Two address ranges may be merged if the two address ranges are contiguous, are in the same state and share the same list of reservations.

A sub network is an object that groups all the range of addresses that contain addresses from this sub network. The properties of a sub network are the address of the sub network, its mask and the list of address ranges part of the sub network.

A reservation is an object that associates a set of reserved addresses with an identifier. The properties of a reservation are its identifier and the list of the ranges of addresses part of the reservation. A reservation listens for the changes of the ranges of addresses that are part of the reservation. If an address range is split, then the new address range is added to the list of address ranges part of the reservation. When two address ranges are merged, the removed address range is removed from the list of ranges that are part of the reservation. This allows the list of address ranges that are part of the reservation to remain consistent. When the state of an address range changes, the reservation updates the address range state. If all the address ranges are now in the state 'reserved' and that the reservation is the first of the list, which means that the reservation is ready to be used.

The improved server references all the sub networks and all the reservations.

Description of a 'get' Request

A client makes a 'get' request to have a given number of addresses from the same sub network.

The improved server first looks for a sub network with enough free addresses. Then, the improved server parses the free address ranges of the sub network and asks the sub network to allocate the addresses of the address ranges until the improved server has the required number of addresses. The address ranges are allocated entirely except the last address range which may be allocated partially to have the exact count.

FIG. 4a shows schematically the allocation of memory in accordance with an embodiment. In order to allocate a range of addresses 400, the sub network looks for a free address range 405 where to allocate the addresses. If the range of addresses to allocate matches the free address range 405, then the state of the free address range 405 is simply changed to 'in use'. If the range of addresses to allocate is at the beginning or at the end of the free address range 405, then the free address range 405 is split into two ranges 410 and 415, one address range 410 in the state 'in use' that contains the addresses to allocate and the other address range 415 in the state 'free' with the remaining addresses.

FIG. 4b shows schematically an alternative memory allocation situation in accordance with an embodiment. If the range of addresses 400 as described with respect to FIG. 4a to allocate is within the free address range 405 as described with respect to FIG. 4a, then the free address range 405 is split into three ranges 420, 425, 430: two address ranges 420, 430 in the state 'free' and in the middle address range 425 in the state 'in use' that contains the allocated addresses.

Description of a 'use' Request

A client makes a 'use' request to allocate a given set of addresses, given as a list of ranges of addresses.

The improved server first beautifies the list of address ranges. Then the improved server retrieves to which sub network the addresses belong, and the improved server retrieves to which address ranges of the sub network the addresses belong. Once the improved server has all the ranges of addresses that contain the addresses to allocate, the improved server checks that all the address ranges are in the state 'free'. If all the address ranges are, then the improved server ask the sub network to allocate all the addresses.

The way a sub network allocates addresses is described in the previous section.

Description of a 'release' Request

A client makes a 'release' request to release (unallocate) a given set of addresses, given as a list of ranges of addresses.

The improved server preferably first beautifies the list of address ranges as described with reference to the beautifying algorithm hereafter. Then the improved server retrieves to which sub network the addresses belong, and the improved server asks the sub network to release all the addresses.

In order to release a range of addresses, the sub network first checks that all the given addresses exist in the ranges of addresses. Then the sub network browses all the address ranges and modifies the address ranges that contain addresses that are to be released. If the state of the address range is 'reserved' or 'free', the sub network does nothing. If the state of the address range is 'in use', the sub network changes the state to 'free' or to 'reserved' if there is a reservation on the address range. If all the addresses of the address range are not to be released, then the address range is first split, then only the state of the new address range corresponding to the addresses to be released is changed. After this, the sub network invokes the compact routine to eventually merge some address ranges as described with reference to the compacting algorithm hereafter.

Description of a 'make reservation' Request

A client makes a 'make reservation' request to reserve a given set of addresses, given as a list of ranges of addresses.

The improved server preferably first beautifies the list of address ranges as described hereafter. Then the improved server retrieves to which sub network the addresses belong. The improved server defines a new reservation identifier and then the improved server asks to the sub network to reserve all the addresses. Finally, the improved server creates a new reservation with all the addresses.

In order to reserve a range of addresses, the sub network first checks that all the given addresses exist into the ranges of addresses. Then the sub network parses all the address ranges to add the reservation in their reservation queue. If the address ranges does not match the ranges of addresses to be reserved, then the sub network first split the existing address ranges before to add the reservation on the appropriate ones.

Once an address range is defined as reserved, in the case where the requesting entity is not the reserving entity, during the attribution process the reserved address range is disregarded at the step of comparing the length of that range of available addresses with the number of addresses requested.

FIG. 5 shows the principle of splitting two contiguous non-homogeneous address ranges to reserve a sequence of addresses spanning those two address ranges. As shown, the improved server receives a reservation request for a particular address range 505. The sequence of addresses 505 straddles two address ranges 510, 520, defined in the address reservation memory. The first defined address range 510 has the status "free", while the second defined address range 520 has the status "in use", that is, attributed to a particular client. In order to implement the "make reservation" instruction, the improved server splits the two address ranges 510, 520 so that there are now four ranges. The address ranges at the extremities, 511 and 521 retain the status of the originally defined address ranges 510, 520, whilst the two inner address ranges 515, 525 accumulate respectively the status of the originally defined address ranges from which the two inner address ranges 515, 525 were split, and the status "reserved".

Finally, the improved server invokes the compact routine to potentially merge some address ranges as described hereafter, and returns all the address ranges that have been reserved.

Description of a 'check reservation' Request

A client makes a 'check reservation' request to check whether a reservation is ready or not.

The improved server retrieves the reservation and then the improved server returns its state.

Description of a 'use reservation' Request

A client makes a 'use reservation' request to switch all the addresses part of the reservation in the 'in use' state. The reservation is then destroyed.

The improved server retrieves the reservation and then the improved server asks the reservation to use the addresses. If this operation succeeds, the improved server removes the reservation from the reservation list and destroys the reservation.

In order to use a range of addresses, a reservation parses all the address ranges part of the reservation, changes their status to 'in use' and remove the reservation from the queue of reservations of the address range.

Description of a 'cancel reservation' Request

A client makes a 'cancel reservation' request to cancel a reservation. The reservation is destroyed, all the addresses that were reserved by this reservation are freed (or the addresses remain reserved, but the next reservation in their queue).

The improved server retrieves the reservation and then the improved server asks the reservation to cancel itself If this operation succeeds, the improved server removes the reservation from the reservation list and destroys the reservation.

In order to cancel itself, a reservation parses all the address ranges part of the reservation. For each address range, the reservation looks at their state. If the state of the address range is 'reserved', then the reservation changes the state to 'free' if there are other reservations, else the reservation let the address range in the state 'reserved', the address range is simply now reserved by another reservation. If the state of the address range is 'in use', the reservation does not change the state of the address range. In any case, the reservation removes itself from the reservation queue of the address range.

Description of the Beautifying Algorithm

This beautifying algorithm, as executed by the improved server, constructs a new beautified list of ranges of addresses from a given list of ranges of addresses, e.g. in a case where a client requests attribution of a list of address ranges. A beautified list of address ranges is a list of address ranges where all the address ranges are not contiguous and sorted by ascendant order. So the algorithm has to remove any duplicates, merge any contiguous address ranges or any address ranges that intersect and sort the address ranges by ascending order.

The algorithm is the following:

iterate through the given list of address ranges. For each address range, do:

if the beautified list of address ranges is empty, then insert the address range into the beautified list and process next range.

iterate through the beautified list of address ranges. For each address range, do:

if the last address of the address range is less than the first address of the address range of the beautified list, then insert the address range into the beautified list of address ranges before the current address range and stop iterating the beautified list.

if the last address of the address range is the one right before the first address of the address range of the beautified list, then merge the address ranges by changing the first address of the address range of the beautified list to the first address of the address range and stop iterating the beautified list.

if the first address of the address range is greater or equal to the first address of the address range of the beautified list and less or equal to the last address of the address range of the beautified list, then merge the intersected address ranges by changing the last address of the address range of the beautified list to the last address of the address range and stop iterating the beautified list.

if the iteration of the beautified list is complete but the address range has not processed, then add at the end of the beautified list.

Figure 6:
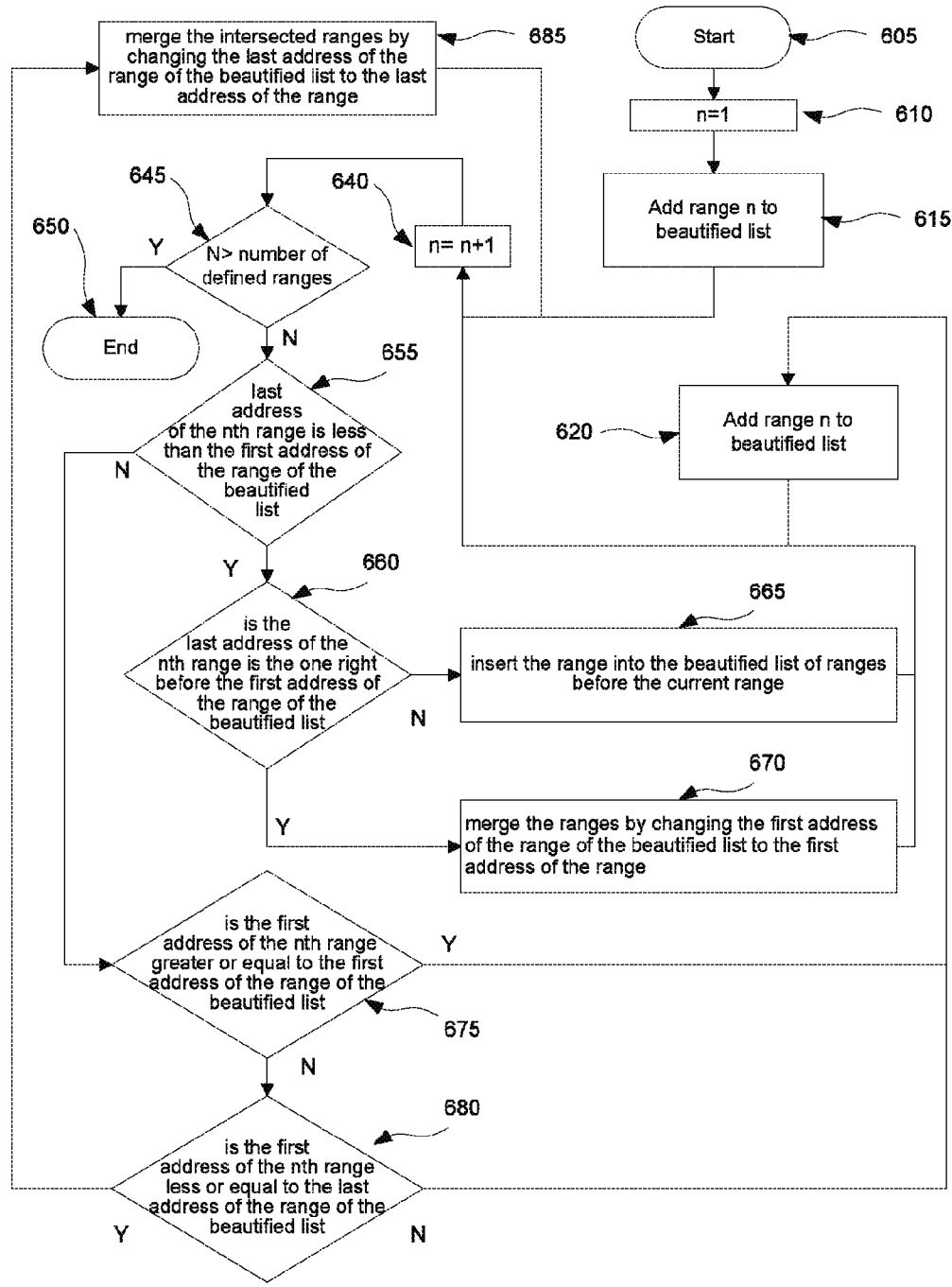
FIG. 6 is a flowchart of the steps of the beautification algorithm.

FIG. 6 is a flowchart of the steps of the beautification algorithm, as executed by the improved server. As shown, the operation starts at step 605 before proceeding to the 610 at which the improved server selects a first address range defined in the address reservation memory by setting n to 1, where n is the number of the address range presently selected. Since this is the first address range to be processed, the beautified list is necessary empty at this stage, so the improved server immediately adds the first address range to the beautified list at step 615. The improved server proceeds to step 640 at which the improved server increments n. The improved server next determines whether n now exceeds the number of address ranges defined in the address reservation memory at step 645. If at step 645 n now exceeds the number of address ranges defined in the address reservation memory, the operation terminates at step 650. Otherwise from step 645, the improved server proceeds to step 655 at which the improved server determines whether the last address of the $n^{th}$ address range is less than the first address of the address range of the beautified list. If at step 655 the last address of the $n^{th}$ address range is less than the first address of the address range of the beautified list, the improved server proceeds to step 660 at which the improved server determines whether the last address of the $n^{th}$ address range is the one right before the first address of the address range of the beautified list. If at step 660 it is determined that the last address of the $n^{th}$ address range is the one right before the first address of the address range of the beautified list, the improved server proceeds to step 665 at which the improved server inserts the presently selected address range into the beautified list of address ranges before the current address range before returning to step 640. If at step 660 it is determined that the last address of the $n^{th}$ address range is not the one right before the first address of the address range of the beautified list, the improved server proceeds to step 670 at which the improved server merges the presently selected address range into the address range defined in the beautified list by changing the first address of the address range of the beautified list to the first address of the address range. If at step 655 it is determined meanwhile that the last address of the $n^{th}$ address range is not less than the first address of the address range of the beautified list, the improved server proceeds to step 675 at which the improved server determines whether the first address of the $n^{th}$ address range is greater or equal to the first address of the address range of the beautified list. If at step 675 it is determined that the first address of the $n^{th}$ address range is greater or equal to the first address of the address range of the beautified list, the improved server proceeds to step 620 at which the improved server adds the presently selected address range to the beautified list before returning to step 640. Otherwise from step 675, the improved server proceeds to step 680 at which the improved server determines whether the first address of the $n^{th}$ address range less or equal to the last address of the address range of the beautified list. If at step 680 it is determined that the first address of the $n^{th}$ address range less or equal to the last address of the address range of the beautified list, the improved server proceeds to step 685 at which the improved server merges the intersected address ranges by changing the last address of the address range of the beautified list to the last address of the address range before returning to step 640. Otherwise from step 680, the method proceeds to step 620.

FIGS. 7a, 7b, 7c and 7d and 7e show an example of operations carried out according to the algorithm of FIG. 6.

Figure 7A:
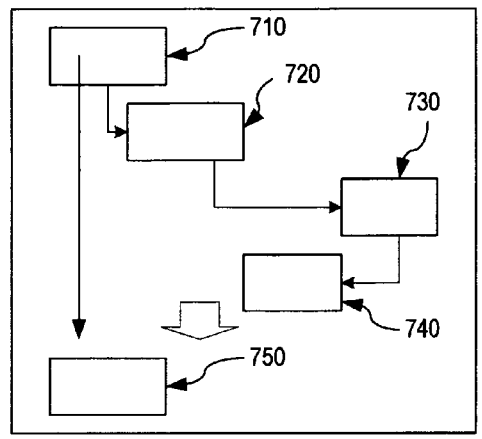
FIGS. 7*a*, 7*b*, 7*c* and 7*d* and 7*e* show an example of operations carried out according to the algorithm of FIG. 6; and in particular

FIG. 7a shows a first stage in the beautification process. As shown the first address range from the improved server to be processed is the address range 710. As described with reference to FIG. 6, the first address range is immediately added to the beautified list as address range 750.

Figure 7B:
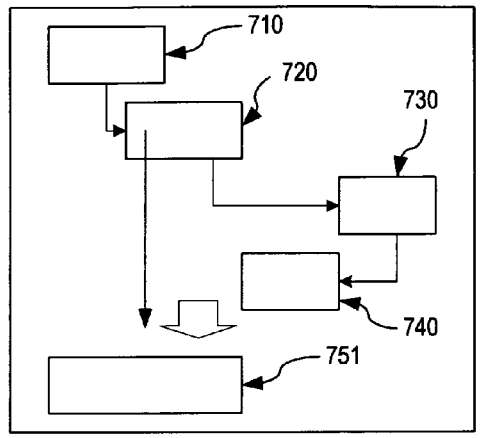

FIG. 7b shows a second stage in the beautification process. The next address range from the improved server to be processed is the address range 720 which is situated in a higher address range of addresses the address range 710, albeit somewhat overlapping. Accordingly the response to step 655 is "no", and to step 675 and 680 are "no" and "yes" respectively, leading to step 685, whereby the new address range 720 is merged into the address range 750 to form a new beautified list address range 751.

Figure 7C:
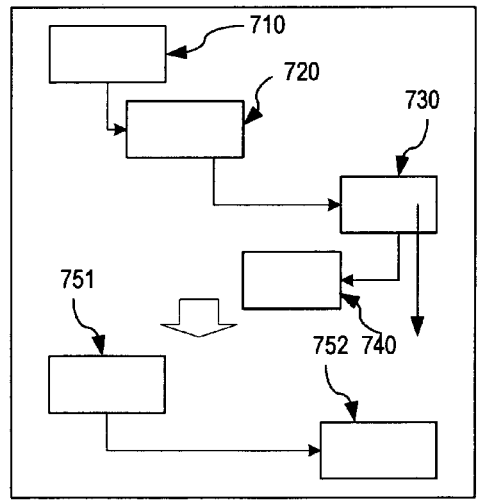

FIG. 7c shows a third stage in the beautification process. The next address range from the improved server to be processed is the address range 730 which is situated in a higher address range of addresses the range 751 without overlap. Accordingly the responses to step 655 is "no", and to step 675 is "yes", leading to step 665, whereby the new address range 730 is added as a new beautified list address range 752.

Figure 7D:
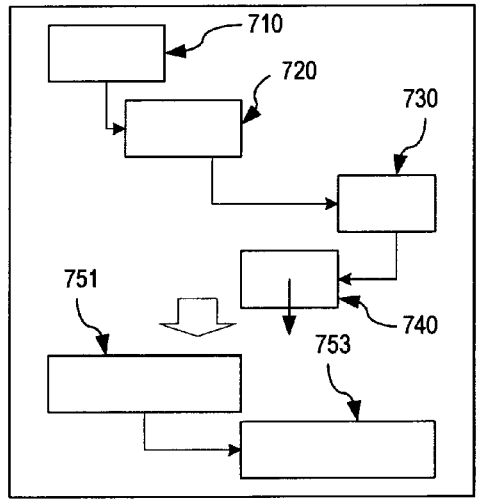

FIG. 7d shows a fourth stage in the beautification process. The next address range from the improved server to be processed is the address range 740 which is situated in an address range of addresses between the address range 751 and 752, without overlap. The process takes the address range 751 as the first basis of comparison, and accordingly the responses to step 655 is "no", and to step 675 is "yes", leading to step 665, whereby the new address range 730 is added as a new beautified list address range. Proceeding to take address range 752 as the first basis of comparison, the responses to step 655 is "yes", and to step 660 is "yes", leading to step 670, whereby the new address range 740 is merged into the second beautified list address range 752 to form a new beautified list address range 753.

Figure 7E:
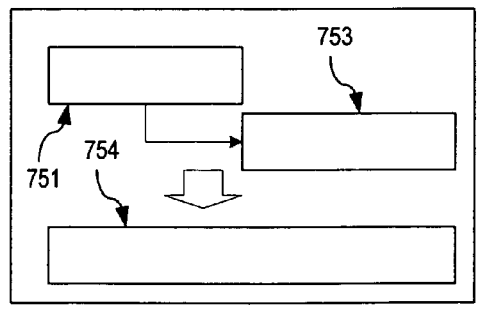

FIG. 7e shows a fifth stage in the beautification process. As described above the algorithm has built a new beautified list of address ranges sorted by ascendant order, but there are still two address ranges 751 and 753 that may still be merged, so another pass is executed.

iterate through the beautified list of address ranges. For each address range from the second one to the end, do:
    if the current address range is contiguous to the previous one, then merge the current address range and the previous address range by changing the last address of the previous address range to the last address of the current address range. Then remove the current address range. The beautified list is now ready, with a single contiguous address range 754.

Description of the Compacting Algorithm

This algorithm compacts the address ranges of a sub network.

The algorithm, as executed by the improved server, iterates through the address ranges of the sub network, starting from the second one, and does the following operations: if the last address of the previous address range and the first address of the current address range are contiguous and the address ranges are in the same state and have the same reservation list, then merge the current into the previous address range by changing the last address of the previous into the last address of the current address range and removing the current address range (see FIG. 4).

Figure 8:
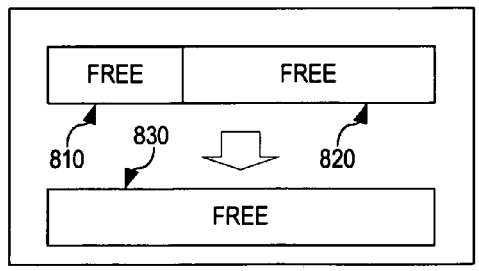
FIG. 8 shows the effect of the compacting algorithm.

FIG. 8 shows the effect of the compacting algorithm. As shown, two address ranges having the same status (in this case "free") 810, 820 are merged to form a new address range 830, having the same status as the original two.

Description of the Statefile Mechanism

Preferably, when the improved server starts, the improved server reads from a file the set of addresses the improved server has to manage. If the statefile is activated, the improved server looks for a statefile. If the statefile exists, then the improved server reads the statefile to restore the improved server's state. If the statefile does not exist, then the improved server creates the statefile and writes the improved server's state into the statefile. Then, the improved server constantly updates the statefile each time a request is processed and some changes made to the improved server's internal state.

As the internal state of the improved server is made of a variable number of address ranges, it is not possible to modify an existing statefile. One approach to maintaining the statefile is to rewrite the statefile completely each time the internal state of the improved server is changed. More preferably, the improved server is adapted to write its state into the statefile followed by a separator. Then, each time a change is made into the internal state of the improved server, the improved server appends a description of the change. This is faster and simpler. When the improved server needs to restore its state from the statefile, the improved server reads the initial state from the statefile (up to the separator), then reads all the changes recorded after the separator and re-implements the changes. In order to avoid that the statefile becomes too large, the statefile may be rewritten entirely every so often, for example every hundred changes.

According to a further embodiment, there is provided an improved server for attributing network addresses to virtual machines in a parallel computing environment, whereby the improved server defines the available range of network addresses as one or more address ranges defined in terms of a start address, an end address and one or more status values applying equally to every address in the address range. Status values may be "in use" "available" "reserved" etc. When a virtual machine requests a set of address ranges, the improved server selects an existing address range comprising sufficient addresses to satisfy the request, and splits the existing address range into new address ranges, one of which comprises exactly the number of requested address, this address range being attributed to the requesting virtual machine. A beautification algorithm regularly parses the address ranges to merge adjacent address ranges having identical status.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The invention claimed is:

1. A method, in a data processing system, of attributing network addresses to virtual machines, wherein all available network addresses are described as one or more continuous network address ranges, each network address range being respectively defined by a start address and an end address, the method comprising:

receiving a request for a number of network addresses from a first requesting entity, thereby forming a requested number of network addresses;

comparing a length of the one or more continuous ranges of unreserved and available network addresses in the memory to the requested number of network addresses;

selecting a range of unreserved and available addresses from the one or more continuous unreserved and available network address ranges in the memory comprising a number of network addresses greater than the requested number of network addresses, thereby forming a selected range of available network addresses;

defining a first new range comprising the requested number of network addresses excised from the selected range of unreserved and available network addresses;

defining one or more further new ranges comprising the remainder of the selected range of unreserved and available network addresses not belonging to the first new range as a reserved network address range for the first requesting entity;

attributing the first new range for the use of the first requesting entity;

responsive to receiving a new request for a new number of network addresses from a second requesting entity, determining whether the second requesting entity is the same as the first requesting entity;

responsive to the second requesting entity not being same as the first requesting entity, disregarding the reserved network address range in comparing the length of that range of available network addresses to the requested number of network addresses;

responsive to the second requesting entity being the same as the first requesting entity, determining whether the reserved network address range is greater than or equal to the newly requested number of network addresses;

responsive to the reserved network address range being greater than or equal to the newly requested number of network addresses, attributing one or more of the network addresses in the reserved network address range for the use of the first requesting entity;

identifying contiguous reserved and available network address ranges or contiguous network address ranges attributed to the first requesting entity; and merging together identified adjacent network address ranges to form a single network address range, wherein successive requests for a same requested number of network addresses are cyclically attributed different ranges of network addresses, even in a case where network address ranges that had previously been attributed have been released before the next request.

2. The method of claim 1, wherein comparing the length of the one or more continuous unreserved and available address ranges to the requested number of network addresses comprises comparing the length of all of the one or more continuous unreserved and available address ranges to the requested number of network addresses, and wherein selecting the range of unreserved and available network addresses from the one or more continuous unreserved and available network address ranges in the memory comprises selecting one unreserved and available network address range of length equal to the requested number of network addresses.

3. The method of claim 1, wherein comparing the length of the one or more continuous unreserved and available address ranges to the request number of network addresses comprises comparing the length of each of the one or more continuous unreserved and available network address ranges in turn until an available network address range of length equal to the requested number of network addresses is identified, and wherein selecting the range of unreserved and available network addresses from the one or more continuous unreserved and available network address ranges in the memory comprises selecting a range of unreserved and available network addresses equal in length to the requested number of network addresses without comparing further continuous unreserved and available network address ranges to the requested number of network addresses.

\* \* \* \* \*